US007275212B2

(12) United States Patent
Leichtling

(10) Patent No.: US 7,275,212 B2
(45) Date of Patent: Sep. 25, 2007

(54) SYNCHRONIZED GRAPHICS AND REGION DATA FOR GRAPHICS REMOTING SYSTEMS

(75) Inventor: Ivan Leichtling, Kirkland, WA (US)

(73) Assignee: Microsoft Corporation, Redmond, WA (US)

(*) Notice: Subject to any disclaimer, the term of this patent is extended or adjusted under 35 U.S.C. 154(b) by 0 days.

(21) Appl. No.: 10/691,836

(22) Filed: Oct. 23, 2003

(65) Prior Publication Data
US 2005/0091571 A1 Apr. 28, 2005

(51) Int. Cl.
G06F 3/00 (2006.01)
G06F 15/16 (2006.01)
G09G 5/00 (2006.01)

(52) U.S. Cl. ............ 715/733; 715/738; 715/740; 715/744; 345/629; 709/231; 709/232; 709/233

(58) Field of Classification Search ........ 715/733–738, 715/741–745; 345/1.1–2, 2.1, 2.2, 629
See application file for complete search history.

(56) References Cited

U.S. PATENT DOCUMENTS

| 5,461,716 | A  | * | 10/1995 | Eagen et al.      | 715/788 |
|-----------|----|---|---------|-------------------|---------|
| 5,491,780 | A  | * | 2/1996  | Fyles et al.      | 715/788 |
| 5,583,993 | A  | * | 12/1996 | Foster et al.     | 709/205 |
| 5,608,872 | A  | * | 3/1997  | Schwartz et al.   | 709/205 |
| 5,682,486 | A  | * | 10/1997 | Grossman et al.   | 715/788 |
| 5,760,769 | A  | * | 6/1998  | Petrie            | 715/759 |
| 5,815,160 | A  | * | 9/1998  | Kikuchi et al.    | 345/661 |
| 5,867,156 | A  | * | 2/1999  | Beard et al.      | 715/753 |
| 6,304,895 | B1 | * | 10/2001 | Schneider et al.  | 709/203 |
| 6,437,803 | B1 | * | 8/2002  | Panasyuk et al.   | 715/733 |
| 6,563,498 | B1 | * | 5/2003  | Hirata et al.     | 345/419 |
| 6,877,027 | B1 | * | 4/2005  | Spencer et al.    | 709/205 |
| 2001/0004254 | A1 | * | 6/2001 | Okahara et al.   | 345/157 |
| 2002/0035627 | A1 | * | 3/2002 | Sutou et al.     | 709/224 |
| 2002/0083098 | A1 | * | 6/2002 | Nakamura         | 707/513 |
| 2003/0085922 | A1 | * | 5/2003 | Wei              | 345/751 |
| 2004/0017394 | A1 | * | 1/2004 | Adachi           | 345/744 |
| 2004/0179036 | A1 | * | 9/2004 | Teplov et al.    | 345/751 |
| 2004/0181796 | A1 | * | 9/2004 | Fedotov et al.   | 719/323 |
| 2005/0033817 | A1 | * | 2/2005 | Wei              | 709/208 |

* cited by examiner

Primary Examiner—Mark Zimmerman
Assistant Examiner—Eric Woods

(57) ABSTRACT

Region data and graphics data for a remoting system are synchronously gathered and sent to a remote display while maintaining synchronicity between the region data and the graphics data. In one implementation, synchronized region data and synchronized graphics data are gathered into one display driver. For the remote display, incoming region data precedes corresponding synchronized graphics data so that the graphics data is displayed according to synchronous region data.

26 Claims, 11 Drawing Sheets

SYNCHRONIZED GRAPHICS AND REGION DATA FOR GRAPHICS REMOTING SYSTEMS

TECHNICAL FIELD

The subject matter relates generally to computing device application sharing and more specifically to synchronized graphics and region data for graphics remoting systems.

BACKGROUND

Graphics remoting systems allow computing device network clients to connect to a server and receive a visual representation of at least some of the graphics being displayed at or output by the server. Often the network client can display all the graphical output associated with the session. Likewise, the client may be allowed to interact with the session, injecting user input, generated from devices such as a mouse or keyboard connected to the client, into the server session. Such a server that allows a client to connect in a "logon session" is sometimes referred to as a "remote server" or a "remoting server." Computing device subsystems that execute remote logon sessions and graphics remoting are sometimes called "terminal services subsystems."

A graphics remoting system can control the amount of graphics sent to a client so that the client does not see everything being displayed on (i.e., "output by") a remoting server. Three categories conveniently divide the degree of graphics sharing between server and client. In "desktop remoting," a client sees substantially everything that would be seen on the canvas of a display monitor connected directly to the server. In "window remoting," a client sees only a window or pane (or a set of windows or panes) from the server's desktop, each window usually projected by the server's operating system for the graphical output and/or user interface (UI) corresponding to one application. Hence, at the server a word processor application might own one window and an email application might own another window, but perhaps only the word processor window would be shared with the client. In "region remoting," only a subset of the server's desktop is shared with a client, but the region shared does not necessarily correspond to a window. In fact, the shared region may be arbitrary.

In order to accomplish this graphical remoting "action-at-a-distance" between a remoting server and a logged-on client, a certain amount of telemetry is needed. From the perspective of the client, an instrumentation at the server side records the "graphics data," that is, information that makes up the visual content of the desktop or a region of the desktop, and sends this graphics data back to the client. The graphics data may describe text, image content, and/or UI features, such as scroll bars and clickable buttons being generated by the server. The graphics data alone may be sufficient information for the above-described desktop remoting, but insufficient for window and region types of remoting. In these latter types of remoting, a second instrumentation at the server side must measure the geometry (i.e., the shape) of a region to be shared, and transmit this geometry information back to the client. The second instrumentation or yet another third instrumentation at the server side must also measure the relative placement of the region to be shared with respect to the server's desktop (hereinafter called "position") and transmit this third type of information back to the client. Thus, to accurately display a region from the server's desktop on its own display, the client must be informed of the region's current graphics data, shape, and position (the latter two being "region data.") The client's view of the region data—the shape and position information—allows the client to divide the server desktop into visible and non-visible regions, i.e., region(s) on which to display associated graphics data and region(s) on which to not display associated graphics data. The client then fills the region(s) to display with the graphics data, or at least clips the graphics data with the boundaries of the region(s) not to display.

Conventionally, the above-mentioned graphics data of a region to be shared is sensed, tracked, and/or gathered continuously by a first instrumentation and transmitted to the client independently of the shape and position information. This first instrumentation usually consists of or relies heavily on well-evolved parts of an operating system's kernel graphics processing subsystem, since much of the graphics tracking is the same as might be used if the server were not a remoting server.

The region data are conventionally gathered in an asynchronous manner by a second instrumentation that is on a completely different scheduler than the kernel components that continuously gather the graphics data. For example, region data may be gathered in user mode, by polling mechanisms. Moreover, the region data are sent to the client desynchronized from the graphics data or, in other words, if the graphics data and region data are combined in a single data stream by a remoting protocol, the combination and adherence to remoting protocol rules does not cure the asynchronicity of the region data with respect to the graphics data. (Asynchronous collection of region data means, for one thing, that the region data collection operates independently of the graphics data collection, i.e., without reference to matching a segment of the graphics data with a segment of the region data.)

The received graphics data and region data are fused together by the client to create the final display. Historically, using two instrumentations working more or less independently of each other to asynchronously collect the graphics data and the region data evolved perhaps because mechanisms in operating system kernels for collecting graphics data were already well-evolved when remoting began to be practiced, and collection of the region data was added as a latecomer or an afterthought. Since they are latecomers, methods for asynchronously collecting region data typically avoid disturbing the operating system kernel, which is the realm of the graphics data collection.

Once graphics data and region data are asynchronously collected for region remoting, they are typically packetized according to a protocol, such as MICROSOFT® REMOTE DESKTOP PROTOCOL (RDP) or CITRIX INDEPENDENT COMPUTING ARCHITECTURE (ICA) PROTOCOL, and sent to the client. (Microsoft Corporation, Redmond, Wash.; Citrix Corporation, Fort Lauderdale, Fla.) The RDP protocol, for example, is just one of many graphics remoting protocols, that is, many graphics remoting protocols are extensible enough to add region remoting for sharing a window or a region of a desktop. If RDP is used as a data transmission component of the remote display telemetry, then it should be noted that RDP is based on, and is an extension of, the T.120 protocol family standards. RDP is a multichannel-capable protocol that allows for separate virtual channels to carry device communication and presentation data from the server, as well as encrypted client mouse and keyboard data.

Conventionally, the graphics data and the region data are desynchronized at their inception by asynchronous collection and may become even more desynchronized depending on how the data is handled as it passes through network layers to be transmitted to and received by a client. The RDP protocol does not cure the desynchronization. By analogy, like a bird watcher whose tracking of a quick pheasant with a pair of excellent binoculars does not stay synchronized (despite the excellence of the binoculars), a remoting client that receives desynchronized graphics and region data (despite the excellence of the remoting protocol), not only misses seeing a desired target on the server desktop but may instead actually see things on the server desktop that he is not supposed to see.

FIG. 1 shows parts of a graphics remoting system 100, including a server display 102 and a client display 104. A window 106 to be shared with the client displays on the server display 102 together with "forbidden visual regions" of secret and private information 108 on the server's desktop. If at any point in time, the graphics data describing the content of the window 106 and the region data describing the shape and placement of the window 106 are not synchronized, the client display 104 will show the intended window 106' incorrectly. For example, if the window 106' moves or is moved from left to right across the desktop of the server display 102 and the graphics data and region data are not synchronized when collected and/or when transmitted to the client, then the client display 104 may continue to display that region of the server desktop where the window was originally positioned 110, but which is now displaying secret information.

This desynchronization causes two problems: not displaying content that should be presented, and displaying content that should not be presented. First, the client display 104 does not show the subset of the server display 102 that the graphics remoting system 100 intends to show the client. That is, if the window 106 intended to be displayed contains data necessary to make business decisions, then the decisions are stalled until correct data is displayed. Second, the client display 104 may show, albeit fleetingly, unintended secret information 112, i.e., a subset of the server display 102 that the graphics remoting system 100 does not intend to share with the client. Hence, the desynchronization presents a security risk if "top secret" information is revealed to a client without the proper clearance. Unfortunately, synchronization problems between graphics data and region data exist in most known graphics remoting systems, wherein clients often see unintended parts of a server desktop.

SUMMARY

Region data and graphics data for a remoting system are synchronously gathered and sent to a remote display while maintaining synchronicity between the region data and the graphics data. In one implementation, synchronized region data and synchronized graphics data are gathered into one display driver. For the remote display, incoming region data precedes corresponding synchronized graphics data so that the graphics data is displayed according to synchronous region data.

DETAILED DESCRIPTION

Overview

The subject matter describes secure and accurate graphics remoting made possible by synchronously gathering region data and graphics data and synchronously channeling both types of data through a graphics remoting server. An exemplary remoting synchronization engine (RSE) includes a display driver that can synchronously capture region data and graphics data for a window or region of a server desktop to be remotely shared with a client. ("Window" and "region" will be used somewhat interchangeably herein, despite differences between "window remoting" and "region remoting.") The RSE avoids the interjection of delays that would desynchronize the region data and the graphics data and then can send the synchronized data according to a remoting protocol, in which region data precede associated graphics data. From the server's point of view, a client is not sent graphics data unless correctly updated region data associated with the graphics data has been sent first. From the client's point of view, graphics data received by the client can be relied upon to correspond to the most recently received region data.

Exemplary System

Figure 2:
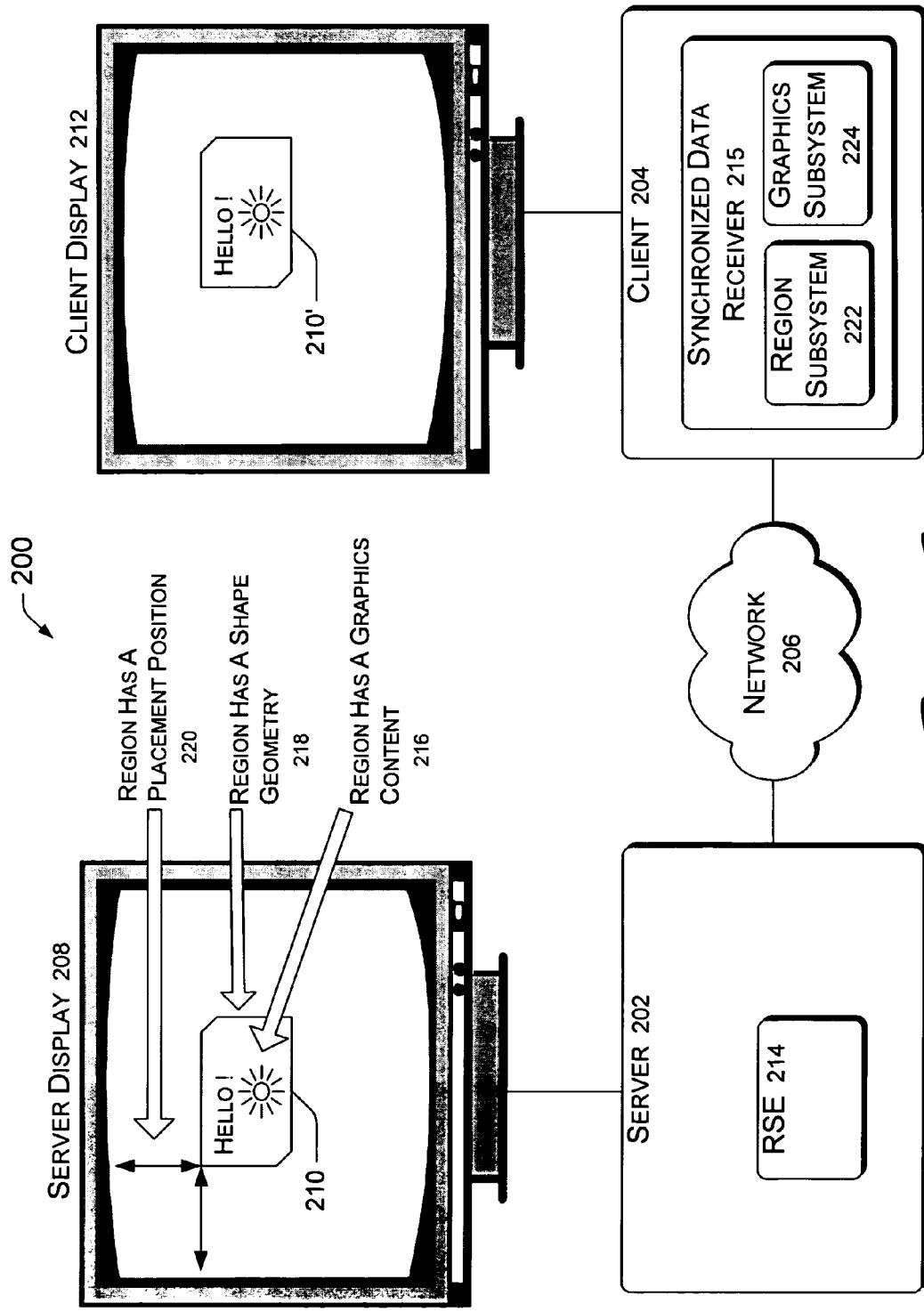
FIG. 2 is a block diagram of an exemplary graphics remoting system in which region data and graphics data are synchronized.

FIG. 2 shows an exemplary remoting system 200 in which a remoting server ("server") 202 is communicatively coupled with a client 204 over a network 206. A server display 208 shows a window 210 to be shared with the client 204 and shown on a client display 212. A remoting synchronization engine ("RSE") 214 included in or associated with the server 202 synchronously gathers graphics data and region data that describe the window 210 and sends synchronized graphics and region data to the client 204. In some implementations, the client 204 includes a synchronized data receiver 215 to receive synchronized region data and associated synchronized graphics data and to display the graphics data as graphics in a region 210' of a client display 212 described by the region data. In other implementations, a discrete synchronized data receiver 215 may not be necessary if an exemplary RSE 214 outputs synchronized data by which a client 204 can correctly display the graphics data clipped by the synchronized region data using conventional mechanisms. An exemplary computing device suitable for use as a server 202 or a client 204 is described below with respect to FIG. 11.

The window 210 to be shared possesses a graphics content 216 including the text "Hello!" and an image of the sun. The graphics content 216 of the window 210 can be described by a set of graphics data to be synchronously collected by the RSE 214. The window 210 also possesses a shape geometry 218 and a placement position 220 on the desktop and/or display canvas of the server display 208. The placement position 220 is sometimes represented by an ordered pair of "x axis" and "y axis" coordinates that describe an offset in two dimensions from a point of origin at coordinates (0,0), usually selected as the topmost and leftmost pixel of the server display 208. In this implementation, the window shape geometry 218 and placement position 220 are collectively described by a set of region data to be synchronously collected by the RSE 214.

Because the graphics data and region data are synchronized by the exemplary RSE 214, when shown on the client display 212, the window 210' accurately reproduces the graphics content 216, shape geometry 218, and placement position 220 of the window 210 as displayed on the server display 208 and/or as output by the server 202 to the client 204. The absolute size of the window 210' as shown on the client display 212 may vary from the size as shown on the server display 208 depending on the relative size of the client display 212 in comparison with the size of the server display 208.

If an exemplary RSE 214 uses a known remoting protocol, such as RDP, to send the region data and the graphics data, then a client 204 may be able to correctly display graphics synchronized to a region 210' without a synchronized data receiver 215. Some implementations of an exemplary RSE 214, however, may not use a known remoting protocol. For example, the subject matter could be practiced in computing and/or multimedia environments that do not use known protocols. The subject matter is not limited by the data transport vehicle employed to send synchronized region and graphics data between server 202 and client 204. Thus, in some implementations, a synchronized data receiver 215, usually included in the client 204, includes a region subsystem 222 and a graphics subsystem 224. The region subsystem 222 receives incoming region data synchronized with graphics data and designated a region 210' of a client display 212 based on the region data. Data buffers may be employed in the client 204 or in the synchronized data receiver 215 to receive and store an incoming synchronized data stream. Thus, both region data and graphics data may be stored while more of the data stream is received. The graphics subsystem 224 receives the graphics data synchronized with the region data and displays graphics in the region 210' based on the graphics data.

Exemplary Engine

Figure 3:
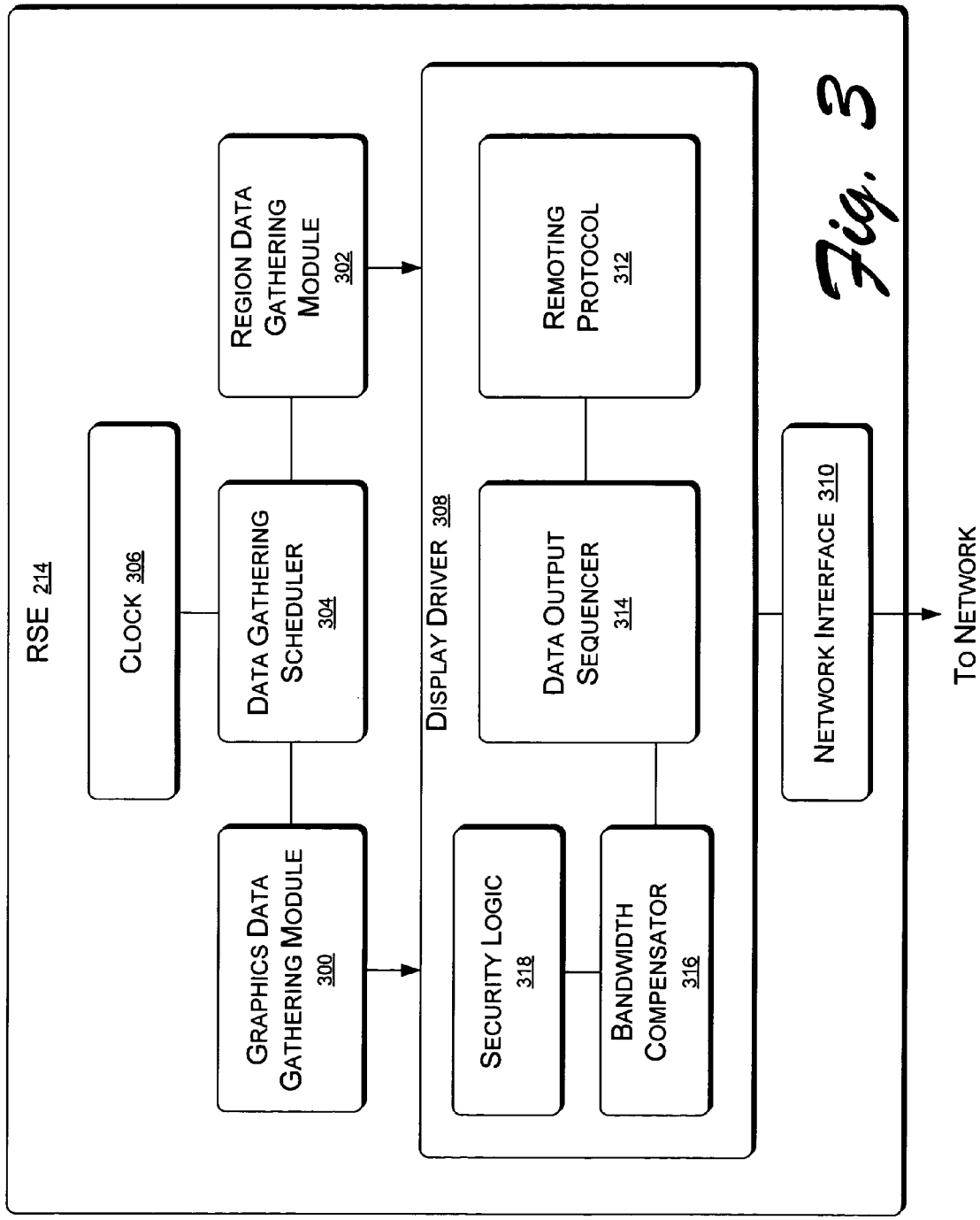
FIG. 3 is a block diagram of an exemplary remoting synchronization engine (RSE).

FIG. 3 shows the exemplary RSE 214 of FIG. 2 in greater detail. The exemplary RSE 214 gathers graphics data and associated region data into the same place at the same time. Accordingly, a graphics data gathering module 300, a region data gathering module 302, a data gathering scheduler 304, a clock 306, a display driver 308, and a network interface 310 are communicatively coupled as illustrated. The display driver 308 may further include a remoting protocol 312, a data output sequencer 314, a bandwidth compensator 316, and security logic 318. The illustrated exemplary RSE 214 is only one example of an RSE 214 that can synchronize graphics data and region data for region remoting. Other exemplary engines capable of performing the subject matter may have different configurations.

The graphics data gathering module 300 synchronously gathers graphics data, which as described above, consist of the visual image content—text, images, icons, borders, UI controls, menus, scroll bars, etc.—of the region to be shared. Since the content of a region typically changes over time, the graphics data may be gathered at discrete intervals, continuously scanned, and/or streamed. In one implementation, the data gathering scheduler 304 sets a time interval, such as 150 milliseconds, for the graphics data gathering module 300 to perform graphics data gathering cycles that match a similarly timed cycle for collecting region data. Such a timed cycle is one construct for synchronizing graphics data and region data, as many operating systems collect graphics data continuously in a stream. In some modalities, only changes to the graphics data from a preceding cycle need be gathered and not a gathering of a complete set of graphics data from scratch.

In one implementation, the graphics data gathering module 300 is an inherent or discrete part of the display driver 308. That is, a display driver 308 such as a WINDOWS® GRAPHICS DISPLAY DRIVER gathers graphics data by collecting primitive drawing commands issued to the WINDOWS® GRAPHICS DEVICE INTERFACE (GDI) subsystem. These drawing primitives are encoded using a remoting protocol 312, such as RDP and sent over a network 206 to one or more RDP clients 204. In such an implementation, the graphics data gathering module 300 may include or comprise WIN32K.DLL and other components associated with the WINDOWS® GDI subsystem. In some implementations, the clock 306 and/or the data gathering scheduler may be a system clock or, the clock function may be inherent in the operating system for collecting or streaming graphics data.

The region data to be sent to a client 204 using the remoting protocol 312 is also gathered in the display driver 308 via the region data gathering module 302. Since a window's or a region's shape geometry and placement position typically change over time, this region data can be gathered at discrete intervals, or more ideally, continuously scanned and/or streamed, to update the client 204. In one implementation, the data gathering scheduler 304 sets a time interval, such as 150 milliseconds, for the region data gathering module 302 to perform region data gathering cycles that match a similarly timed cycle for gathering corresponding graphics data. In some implementations, only changes to a preceding set of region data gathered in the preceding cycle need be considered.

In one implementation, the region data gathering module 302 synchronously gathers (and/or tracks) relevant region data by including and/or comprising a window object, "WNDOBJ," created via a WINDOWS® SERVER DRIVER DEVELOPMENT KIT (DDK). A WNDOBJ is a driver-level window object that can be created to contain information about the shape geometry and placement position, i.e., the region data, of a visual region. By creating a WNDOBJ that corresponds to an application region to be shared, the display driver 308 can track the region data that represent changes in the shape geometry and placement position of that visual region.

An exemplary WNDOBJ structure allowing a display driver 308 to keep track of region data changes of a region being shared is shown below in TABLE 1:

TABLE 1

```
typedef struct _WNDOBJ {
    CLIPOBJ   coClient;
    PVOID     pvConsumer;
    RECTL     rclClient;
    SURFOBJ   *psoOwner;
} WNDOBJ, *PWNDOBJ;
```

Members of the exemplary WNDOBJ structure in TABLE 1 include:

coClient, which specifies a CLIPOBJ structure that describes the client region of the window. If iDComplexity is DC_RECT and the left edge in rclBounds is greater than or equal to the right edge, or the top edge is greater than or equal to the bottom edge, the client region is invisible.

pvConsumer, which points to a driver-defined value that identifies this particular WNDOBJ structure. This value can be set by calling the WNDOBJ_vSetConsumer function.

rclClient, which specifies a RECTL structure that describes the client area of the window in screen coordinates. This rectangle is lower-right exclusive, which means that the lower and right-hand edges of this region are not included.

psoOwner, which points to the SURFOBJ structure that was passed to EngCreateWnd when this WNDOBJ was created.

The region data for the region shared with the client 204 can be enumerated by calling the WNDOBJ_cEnumStart and WNDOBJ_bEnum functions. A display driver 308 can associate its own data with a WNDOBJ by calling the WNDOBJ_vSetConsumer function.

As a synchronizing element in an exemplary RSE 214, a display driver 308 can access public members of the WNDOBJ. These public members are guaranteed to remain unchanged only in the context of the driver callback routine supplied to the GDI subsystem in the EngCreateWnd function, or the functions where a WNDOBJ is given.

The display driver 308 should use the SURFOBJ to which psoOwner points to retrieve a driver-specific state relevant to the WNDOBJ, such as the display driver's PDEV handle, rather than maintain global variables.

To establish a region to be shared with a client 204, an application can use the WIN32 application program interface (API) to access the WNDOBJ_SETUP functionality implemented by a display driver 308. Access is gained through the WIN32 ExtEscape function. The aforementioned GDI subsystem passes this escape call to the display driver 308 with DrvEscape, implemented by the display driver 308 with WNDOBJ_SETUP for the value of iEsc.

An application to be shared between server 202 and client 204 calls ExtEscape(hdc, WNDOBJ_SETUP, . . . ) and passes a handle to the application-created window (created by CreateWindow or some equivalent WIN32 function) through an input buffer to the display driver 308. If the display driver 308 is to receive gathered region data associated with the region, it calls EngCreateWnd, within the context of the ExtEscape call, to create a WNDOBJ structure for the given window. From that point on, shape geometry changes and placement position changes with respect to the application-created window thus configured will pass down to the display driver 308.

A suitable display driver 308 for the above-described implementation handles the ExtEscape call in a manner similar to that shown in TABLE 2:

TABLE 2

```
ULONG DrvEscape(
SURFOBJ *pso,
    ULONG   iEsc,
    ULONG   cjIn,
    PVOID   pvIn,
    ULONG   cjOut,
    PVOID   pvOut)
{
    WNDOBJ *pwo;
    WNDDATA *pwd;
    if (iEsc == WNDOBJ_SETUP)
    {
        pwo = EngCreateWnd(pso,*((HWND *)pvIn),&DrvVideo,
                          WO_RGN_CLIENT, 0);
        // Allocate space for caching client rectangles.
        // Remember the pointer in the pvConsumer field.
        pwd = EngAllocMem(0, sizeof(WNDDATA), DRIVER_TAG);
        WNDOBJ_vSetConsumer(pwo,pwd);
        // Update the rectangle list for this wndobj.
        vUpdateRects(pwo);
        return(1);
    }
}
```

Creating a window object involves locking special window resources, therefore EngCreateWnd should be called only in the context of the WNDOBJ_SETUP escape in DrvEscape or DrvSetPixelFormat.

The EngCreateWnd function even supports gathering region data by each of multiple display drivers 308. Through EngCreateWnd, each display driver 308 identifies its own callback routine that the GDI subsystem is to call for changes to the corresponding region. This feature allows, for example, a display driver 308 for live video to gather region data corresponding to changes in live video windows while an OpenGL display driver 308 is gathering region data corresponding to changes in OpenGL windows.

The GDI subsystem will call back to the display driver 308 with the most recent region data if a new WNDOBJ is created in DrvSetPixelFormat or ExtEscape. The GDI subsystem will also call back to the display driver 308 when a region referenced by a WNDOBJ is destroyed.

Gathering region data representative of changes in shape and/or placement of a region may involve the use of three callback functions provided to support the WNDOBJ structure. The region visible on the client 204 may be enumerated by calling the WNDOBJ_cEnumStart and WNDOBJ_bEnum callback functions. A display driver 308 may associate its own data with a WNDOBJ by calling the WNDOBJ_vSetConsumer callback function.

Thus, in the implementation just described, a WNDOBJ synchronously informs the display driver 308 of changes to the region visible on a client 204. Since in this implementation the display driver 308 is also the place where graphics primitives are synchronously collected via GDI APIs, the synchronized region data and graphics data can be correlated to each other (or kept correlated to each other) and sent in a secure synchronized fashion to the client 204, e.g., first the updated region data current at the end of a given time interval and then the graphics data corresponding to the region data. Gathering the graphics data and the region data to one junction point in the exemplary RSE 214, or more specifically to one junction point in an exemplary display driver 308, is one aspect that allows the synchronization described by the subject matter. From the junction point, the graphics data and region data are kept synchronized up to and including delivery to the client 204.

Figure 4:
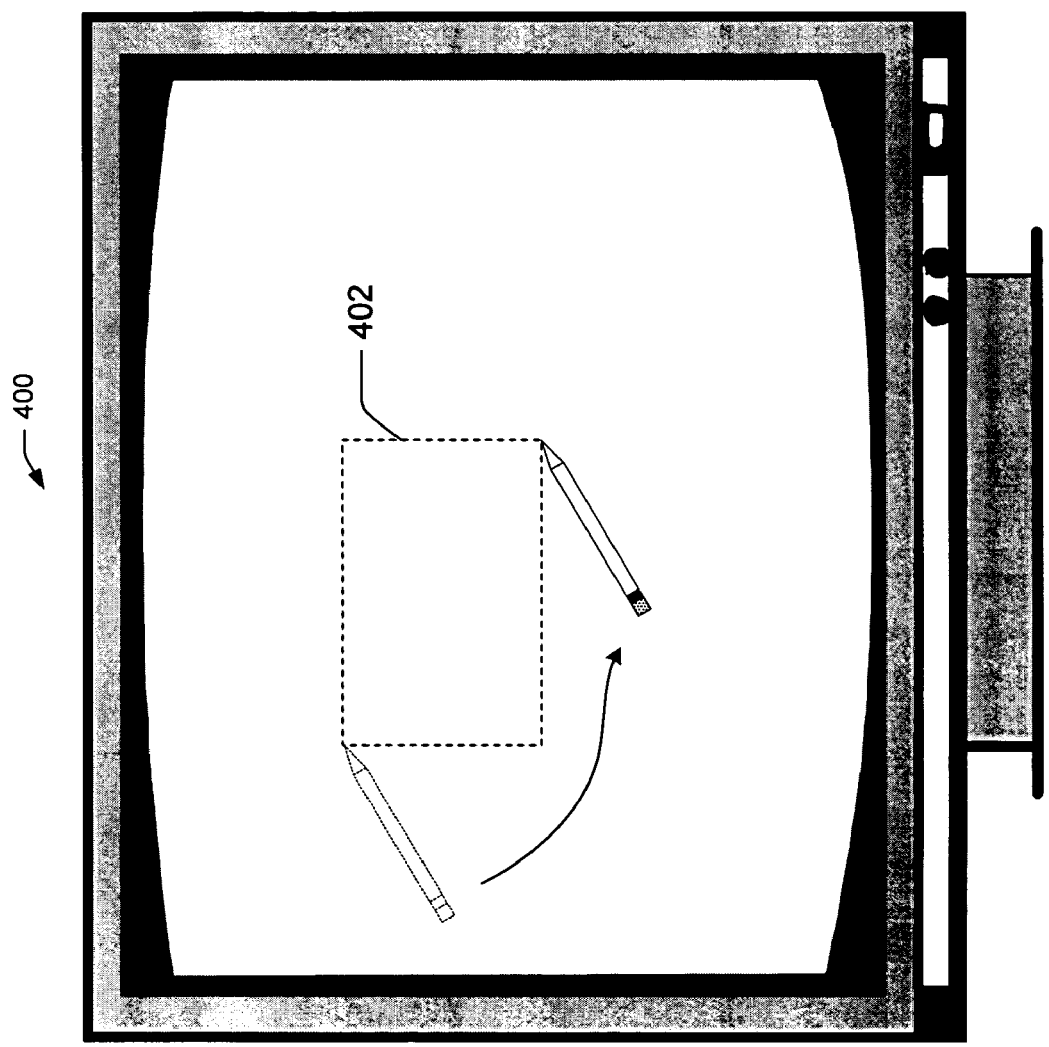
FIG. 4 is a graphic representation of an exemplary alternate technique for establishing a shared region for exemplary synchronized remoting.

A region of a server desktop to be shared with a client 204 need not be an application window. There many ways of describing a region of a display canvas that has region data with which graphics data can be synchronized. As shown in FIG. 4, which depicts an exemplary method 400 of manually creating a viewport region 402, a user on either the server side or the client side may manually draw a rectangle or other shape on the relevant display screen (e.g., 208, 212) to create, for example, a manually "mouse-dragged" viewport region 402. The viewport region 402 visually encloses everything to be shared with the client 204. In other words, the display driver 308 can store the viewport region 402 as a display screen region having shape geometry and placement position, i.e., region data, and send this region data out in advance of sending graphics data for the viewport region 402. As a result, graphics displayed will be accurately clipped by the described viewport region 402. This presents an alternative mechanism for producing synchronized region data as compared with data gathering mechanisms presented above with respect to a region data gathering module 302 of an exemplary RSE 214.

Returning to FIG. 3, the data output sequencer 314 may direct and oversee the use of a remoting protocol 312 to ensure that region data (e.g., associated with a given interval, cycle, or "timeslice") stays associated with its corresponding graphics data. One way to maintain the association between corresponding synchronized region data and synchronized graphics data is to send the two types of data in a certain order representing the association—to be processed on the client side by a client that understands both the association and the sequential order that represents the association. Thus, in one implementation, region data always precedes its corresponding graphics data. This may mean that the synchronous region data is always transmitted to the client 204 before corresponding synchronous graphics data, but even more importantly it means that if relevant region data is sent to the client 204, the client 204 updates the region data first before processing graphics data corresponding to the region data. Thus, a secure linkage—a "synchronicity"—is formed between the region data and the graphics data. The client 204 can rely on possessing current region data for any graphics data received. In other words, a client 204 knows that any graphics data received correspond to previously received region data. Graphics data applied to the client display 212 are shown (or "clipped") with the latest region data, resulting in correctly synchronized display of a shared region. The exemplary RSE 214 thereby aims to ensure that graphics data within the intended visible region to be shared with a client 204 is not undisplayed and graphics data within the non-visible region for the client 204 is not inadvertently displayed.

Figure 5:
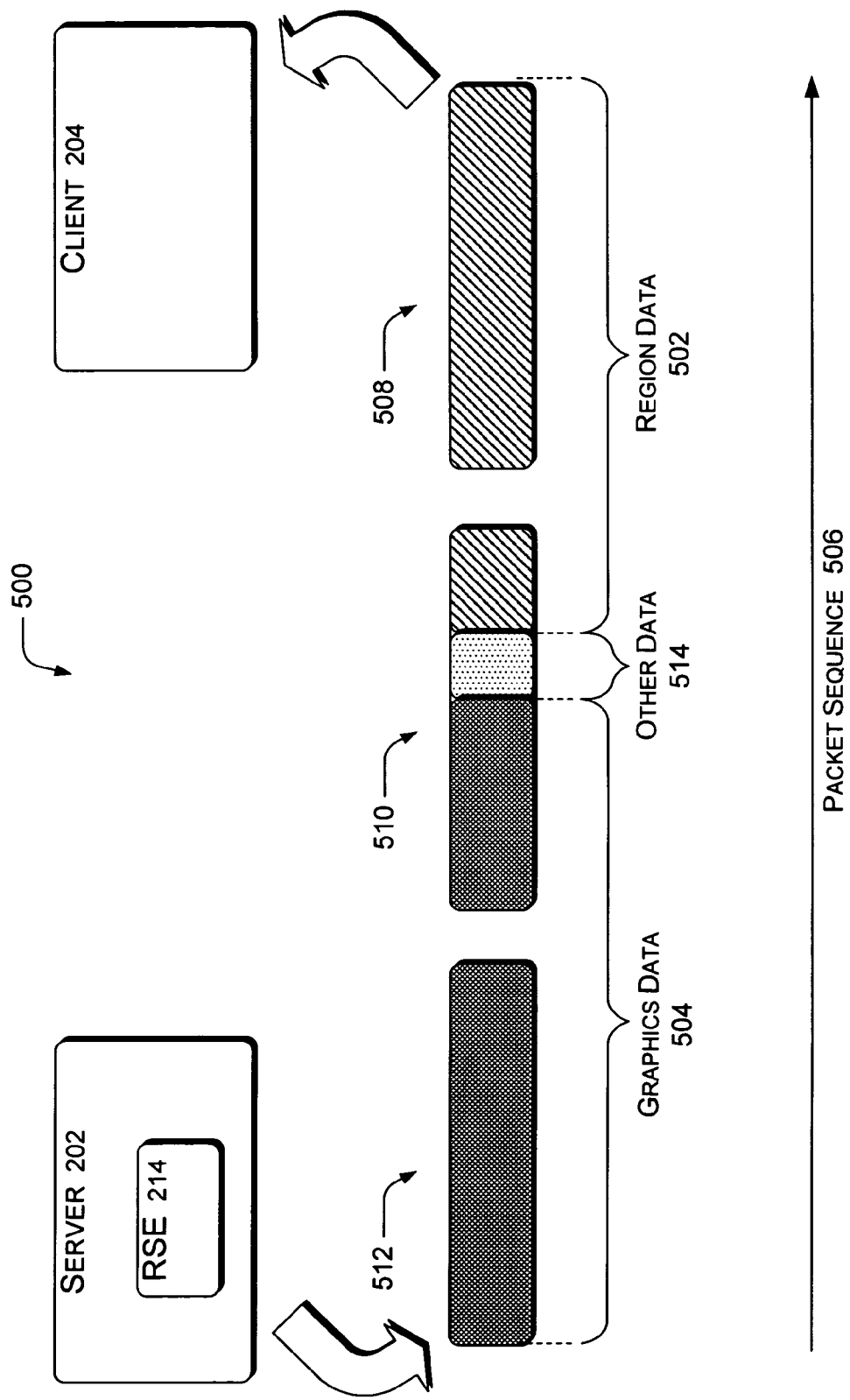
FIG. 5 is a graphic representation of an exemplary data stream structure.

As shown in FIG. 5, a data output sequencer 314 creates an exemplary data structure 500, usually via a remoting protocol 312, such as RDP. The data output sequencer 314 controls the use of the remoting protocol 312 to send a client 204 the region data 502 first. Only after the region data 502 has been sent, the data output sequencer 314 sends graphics data 504 synchronized with and therefore pertaining to the preceding region data 502. A client 204 can store the region data 502 while receiving corresponding graphics data 504. Thus, the data output sequencer 314 uses the remoting protocol 312 to packetize the region data 502 and the graphics data 504 in a data packet (or protocol data unit (PDU)) sequence 506. Individual packets in the sequence 506 can arrive randomly and out of order at the client 204, but packets typically bear a sequence number in their respective headers for reassembling the correct data packet sequence 506. Hence, even if the region data 502 is not actually received first by the client 204, the sequence 506 is reconstructable as the client 204 buffers incoming packets so that from the client's view the region data 502 precedes and modifies display of its corresponding synchronized graphics data 504.

As regards versions of RDP, the subject matter creates an RDP alternate secondary PDU that packetizes the region data 502 for a given region data update, timeslice, and/or iteration before packetizing the graphics data 504. If a first packet 508 lacks capacity for current region data 502, then remaining region data 502 is sent in a next packet 510. Likewise, the graphics data 504 follows the region data 502, and fills up packets (e.g., 512) as needed to send ongoing synchronized graphics data 504 associated with current set of region data 502.

If region data 502 does not change, that is, does not change over multiple succeeding timeslices, then succeeding region data 502 does not have to be sent to a client 204 until the region data 502 again changes, and succeeding graphics data 504 sent to the client 204 simply refers to the most recently sent and received region data 502.

As mentioned, the region data 502 typically includes a description of the shape geometry of a shared region as well as the desktop placement position of the shared region. The description of the shape geometry consists of an encoded collection of rectangles that approximate the shape of the shared region. (Pixel displays typically portray images as collections of rectangles.) The data output sequencer 314 may establish a maximum number of rectangles to be used to describe the shape of a shared region. Above the maximum number, the data output sequencer 314 may call the bandwidth compensator 316 and security logic 318 to decrease the amount of region data 502 without compromising security, especially if transmission bandwidth to the client is limited. For example, a shared word processor application window might be described by a single simple rectangle. When a menu window from a non-shared application is opened in the middle of (and on top of) the shared word processor application window, the word processor window shape to be described by the region data 502 becomes a complex doughnut shape. Multiple rectangles are now needed instead of the single simple rectangle to describe the word processor window, requiring more region data 502. Shared windows or regions can be very complex and may require a large amount of region data. For example, a window consisting of a popular movie skin that includes webs and feathers requires approximately 10,000 rectangles to describe. Secure solutions for continued remoting during times of bandwidth constraint due to complex shared window shapes are discussed further with respect to FIGS. 6-8, below.

The desktop placement position component of the region data typically requires less bandwidth than the shape geometry for a shared region. Offset coordinates of a top leftmost part of the shared region from an origin point (0, 0) of a display screen—e.g., (0, 0) as the top leftmost pixel—can effectively describe the position of a shared region. Further, if the shared region is a simple rectangle, then two sets of offset coordinates describing the top leftmost corner of the shared window and the bottom rightmost corner of the shared window can effectively describe both the placement position and the shape geometry of the rectangle.

Data sequences (e.g., 506) specified by a data output sequencer 314, including sequences 506 that implement the exemplary technique of preceding graphics data 504 with synchronized region data 502, do not typically take up significantly more bandwidth than conventional data sequences comprised of conventional remoting PDUs. RDP, in fact, has its own bulk compression engine. Region data 502 may include 64 bits allotted per rectangle to describe shape geometry and 32 additional bits allotted for each region being described. Thus 96 bits are needed if a region has one rectangle, 160 bits if the region has two rectangles, etc. This type of rectangle data can be highly compressed at rates of approximately 50% to approximately 90% because the rectangles tend to be regular and encoding algorithms are available that might be adaptable to reduce the number of bits needed to send the synchronized region data 502 and synchronized graphics data 504 to a client.

RDP has many pre-existing rules. The subject matter described herein adds a rule that graphics data 504 are not sent before associated synchronized region data 502 or, in one implementation, if the graphics data 504 are sent before the associated synchronized region data 502, then the graphics data 504 are designated to not be processed before the region data 502. This rule does not preclude other types of information 514 coming between or being interspersed with the synchronized region data 502 and the synchronized graphics data 504, such as mouse pointer position data (which may be packetized to precede even the region data 502); conference control data; quality of service (QoS) data; etc. These other types of ancillary data may be interspersed before, after, and/or between the synchronized region data 502 and succeeding associated graphics data 504.

To recapitulate, an exemplary RSE 214 synchronously gathers data, both region data 502 and graphics data 504, together into one junction point without losing the synchronicity of the data. Regardless of whether WNDOBJ is used to gather window region data, or whether a WINDOWS® GRAPHICS DISPLAY DRIVER is used to gather graphics data, as long as the exemplary RSE 214 gathers the region data 502 and the graphics data 504 in a synchronous fashion, the subject matter can be practiced. As mentioned above, the RDP protocol is just one of many graphics remoting protocols that are extensible enough to be capable of adding region remoting and thus are usable for practicing the described subject matter.

In one implementation, a bandwidth compensator 316 may exert influence on the data sequencing performed by the data output sequencer 314. In some circumstances, bandwidth for transmitting data packets to a client 204 may be temporarily insufficient. The bandwidth compensator 316 decides how to handle insufficient bandwidth, based in some implementations upon security logic 318. The security logic 318 includes security measures and different security protocols for various scenarios.

Security Implementations

An exemplary RSE 214 can be used in many types of applications and scenarios. The type of application can determine the specific security measures to be used in circumstances of low bandwidth. How an exemplary RSE 214 maintains synchronicity of graphics data and region data in conditions of low bandwidth depends on the application and the level of security desired and/or appropriate for the application. A low bandwidth condition may arise when the region data and/or the graphics data become larger than a status quo available bandwidth. For example, a remotely shared word processor window usually has more ongoing graphics data due to ongoing typing than a region data needed to maintain the unmoving rectangular window. Remotely shared Internet browser windows with their constantly changing animations have graphics data that typically dwarf the region data needed to describe the remotely shared window. An application that has both complex graphics and a complex shape may exceed the bandwidth needed to maintain synchronized graphics data and region data remoting. Three different types of application environments 600, 700, 800 for an exemplary RSE 214 are described below to illustrate the ways an exemplary RSE 214 can respond to low bandwidth conditions.

Figure 6:
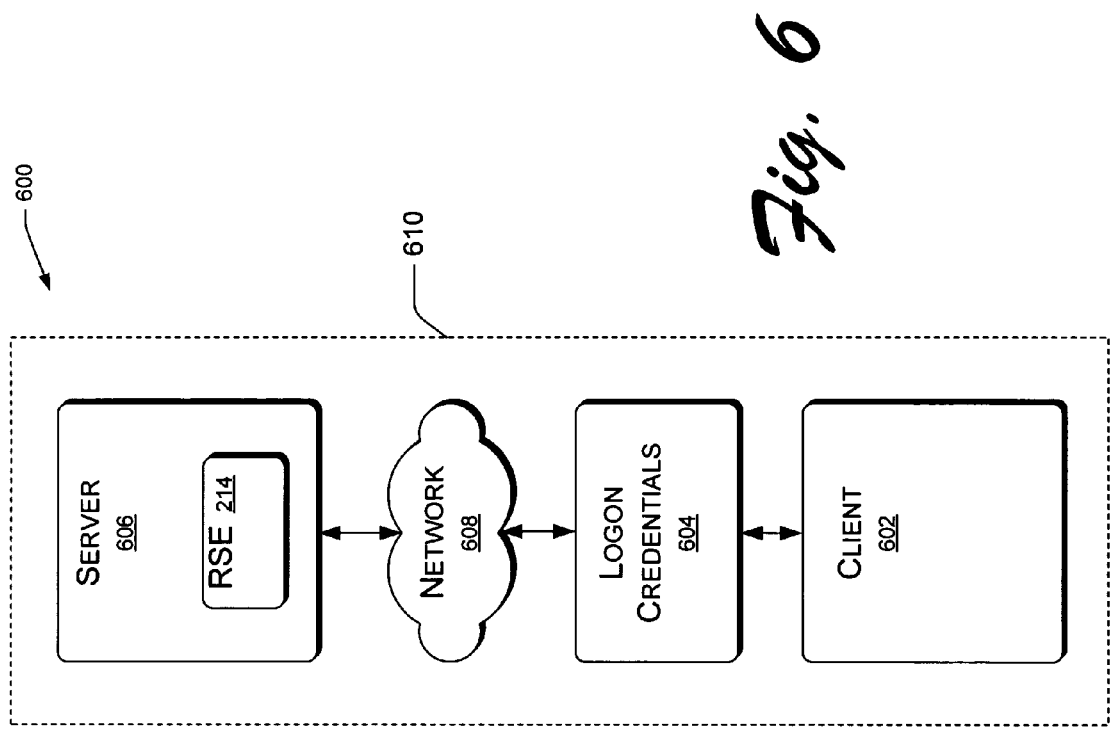
FIG. 6 is a block diagram of an exemplary remote application sharing system in which the client owns the logon session and security is maintained during a low bandwidth condition.

FIG. 6 shows a remote application sharing environment 600 in which a client 602 uses logon credentials 604 to access a remoting server 606 over a network 608. In this environment 600, a low bandwidth circumstance may arise in which there is not enough network capacity to send all synchronized region data and graphics data that would be needed for window remoting or region remoting or, other internal allowances have been exceeded causing the bandwidth constraint. The low bandwidth may occur because the shape of the window being shared has become too complex (e.g., too many rectangles) to be described in the region data using the available bandwidth.

When the data output sequencer 314 can no longer continue sending all the synchronized region data and subsequent associated graphics data due to bandwidth constraints, the security logic 318 associated with the remote application sharing environment 600 may inform the bandwidth compensator 316 to change the manner in which data is being sent, or the change the data itself.

In one scenario, the data output sequencer 314 sends region data and graphics data as if there were no bandwidth constraints, only slower. This type of solution included in the security logic 318 may cause the client's display of the shared window to hang or freeze, at least temporarily until bandwidth increases or until "one-time" complex region data is received and thereafter remains relatively unchanged (the complexly shaped window does not move on the screen).

An alternative solution for the example remote application sharing environment 600 entails abandoning the region remoting and switching at least temporarily to desktop remoting. Desktop remoting shows the client 602 more information than intended in a remote application sharing environment 600, but since the client 602 "owns" the entire session 610 due to the logon credentials 604 and the region remoting is occurring just to improve workflow, there is no security leak in showing the client 602 a larger subset of the limited universe of information that the client has clearance to see. Thus, when faced with insufficient bandwidth to perform region remoting in a remote application sharing environment 600, the bandwidth compensator 316 may switch to desktop remoting, thereby temporarily abandoning the region data and the need for synchronization.

Figure 7:
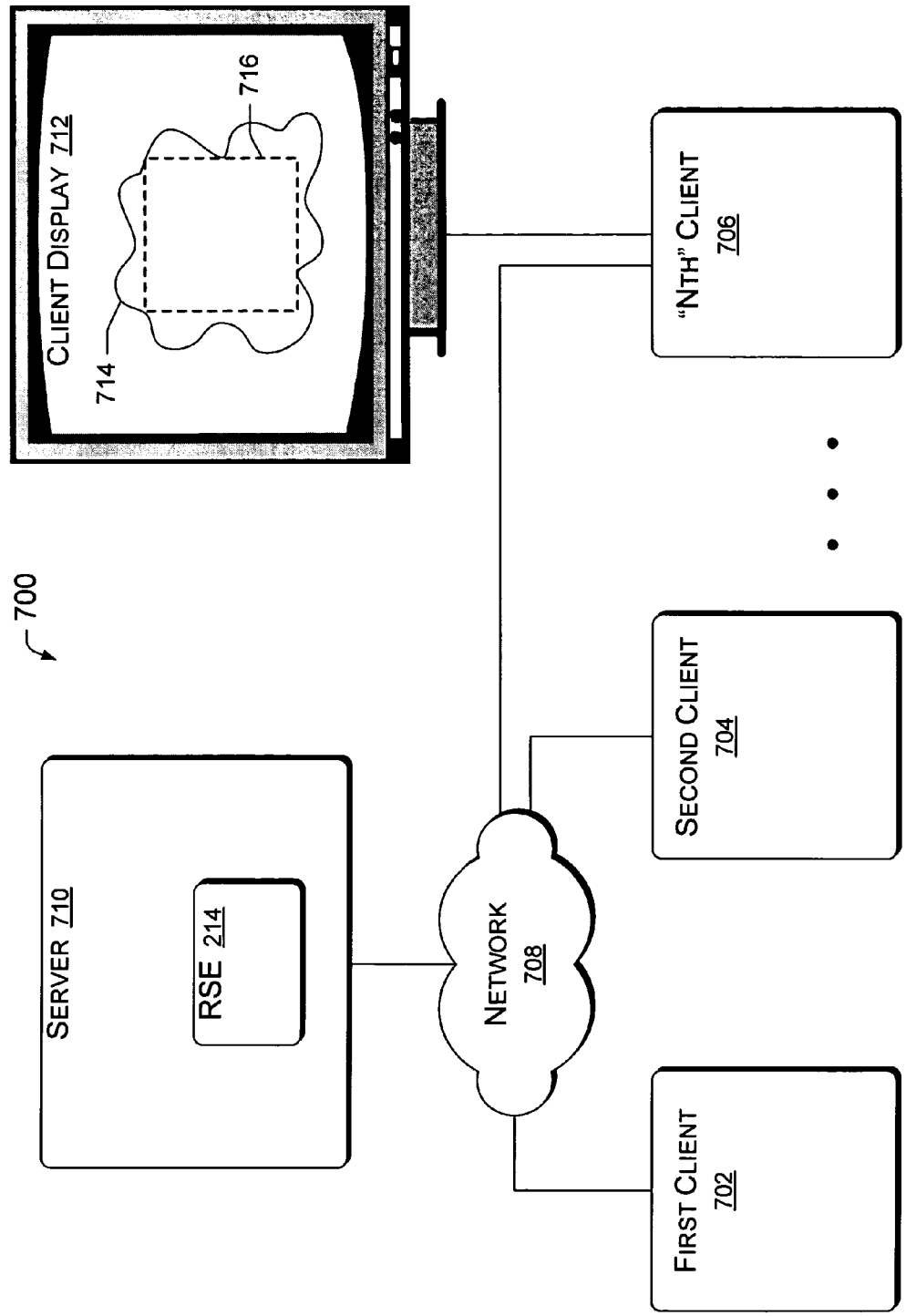
FIG. 7 is a block diagram of an exemplary collaborative remoting system in which security is maintained during a low bandwidth condition.

FIG. 7 shows a multiparty conferencing or "collaborative" environment 700 in which multiple clients, such as a first client 702, a second client 704, . . . , and an "nth" client 706 are communicatively coupled over a network 708 with a remoting server 710 that includes an exemplary RSE 214. Region remoting displays a subset of the server's desktop simultaneously at each client, for example, when a "show meeting notes only" option is selected. Each client may send input to affect the window 714 or region being shared. For example, if the first client 702 drags the window 714 being shared across the his display canvas using a mouse, then the window 714 is also dragged across all the other client's display screens. Likewise, if the "nth" client 706 clicks on a button in the window 714 or region being shared, then the action taken at the server by the button being clicked effects all the clients 702, 704, . . . , 706.

Figure 1:
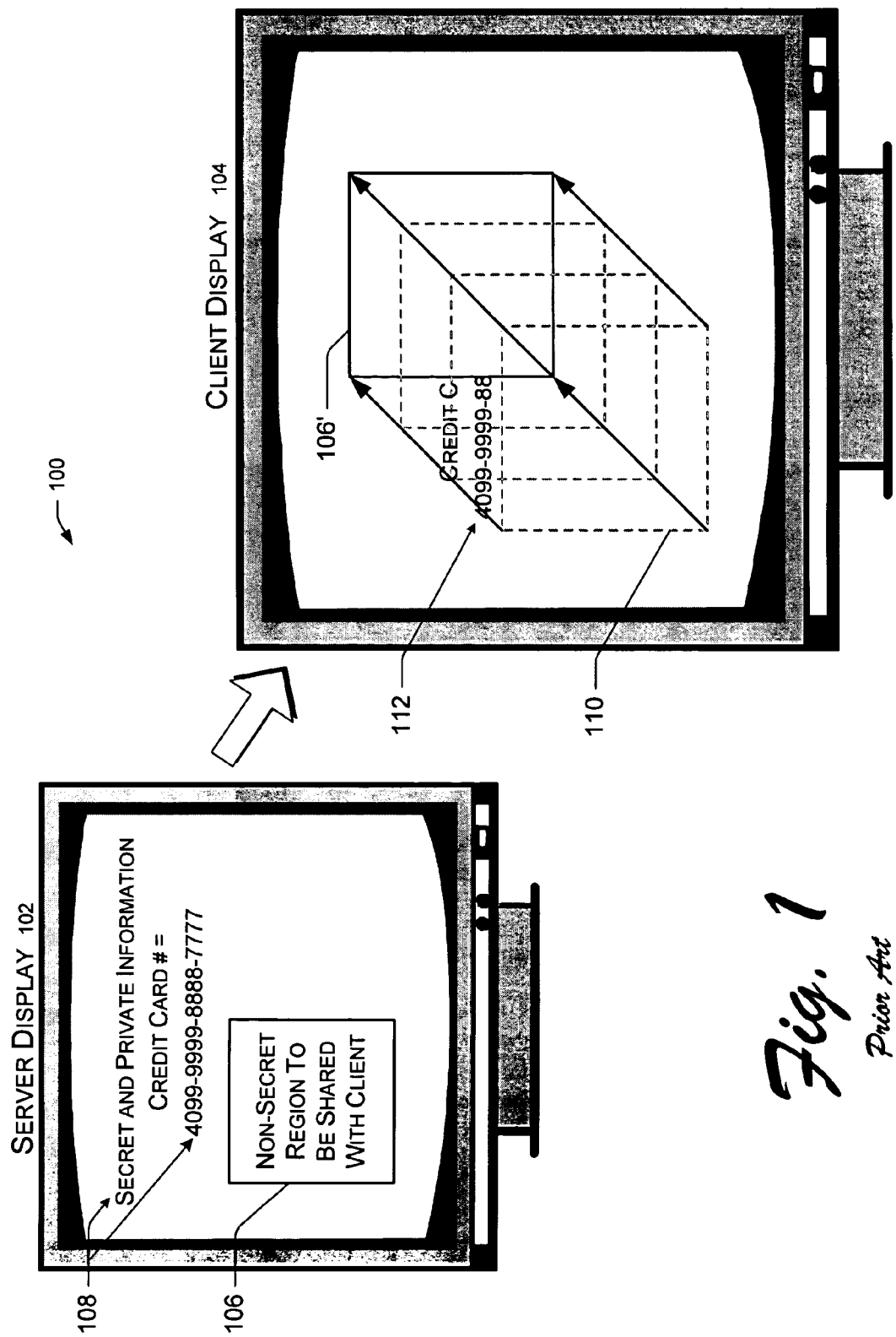
FIG. 1 is a graphic representation of a conventional problem occurring with conventional graphics remoting systems.

In this collaborative environment 700, no one client owns the session. Therefore, showing any client more than the window 714 or region being shared is a security risk (as illustrated in FIG. 1). In conventional systems, when one of the clients inadvertently moves the window 714 being shared across another application window not being shared on the server desktop, glimpses of the window not being shared are often visible for a short time on each of the clients' display screens, because of lack of synchronization between region and graphics data.

In a relatively low bandwidth condition, for example when the region data becomes too complex due to an unusual shape of a window 714 or region being shared or when the quality of service of the network falters, the bandwidth compensator 316 may decide how the data output sequencer 314 should continue sending the region and graphics data in the collaborative environment 700. Since the clients may not have clearance to view the entire server desktop, switching to desktop remoting to reduce region data is not included as an option in the security logic 318 for the collaborative environment 700. If the exemplary RSE 214 can show a subset of the shared region that would significantly reduce region data within the bandwidth constraints, this solution can be selected as an option from the security logic 318. The display driver 308 of the RSE 214 then inscribes a smaller region 716 with a simple shape, e.g. a single rectangle, within the too complex shared region 714. This may greatly reduce the amount of region data if fewer rectangles are required to describe the new inscribed shape, but may also clip off some of the shared region. For example, some of the text and images, as well as clickable icons and buttons, pull-down menus, and scroll bars may be clipped off from visibility when the smaller region 716 displays. While this results in an undesirable operational inconvenience—a usability issue—that is hopefully temporary, still security has been maintained as the exemplary RSE 214 reliably assures that no unallowed part of the server desktop has been displayed to the clients 702, 704, . . . , 706.

Figure 8:
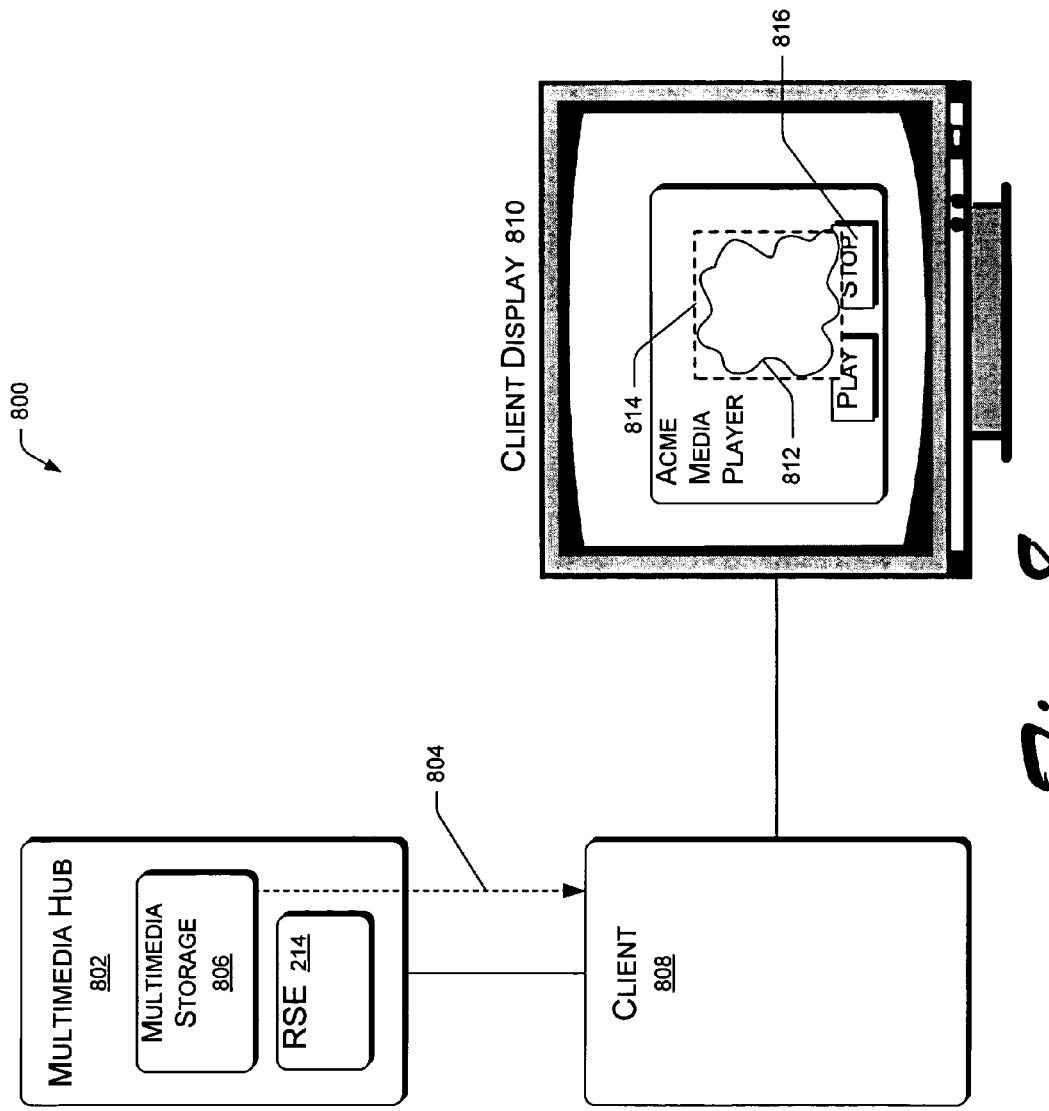
FIG. 8 is a block diagram of an exemplary multimedia remoting system in which security is maintained during a low bandwidth condition.

FIG. 8 shows a multimedia environment 800 in which an exemplary RSE 214 that is included in a remoting server or that is associated with a multimedia hub 802 is used to send a media stream 804 (e.g., from multimedia storage 806) to display on a client 808. In this case, the client 808 may be a computing device or a television set-top box that drives a client display 810. In one scenario, the media stream 804 itself may be sent on an out-of band channel, outside of a remoting protocol 312, such as RDP, and outside of terminal services protocols, etc.

In this type of application, an exemplary RSE 214 provides a way for the client 808 to decode the media stream 804 and plays it "on top" of a remoting protocol 312 and/or a terminal services protocol in use, that is, the media stream 804 is played on a client 808 that is using a remoting protocol 312 and/or a terminal services protocol, but the media stream 804 itself is not being transmitted by the remoting protocol 312 and/or the terminal services protocol. The exemplary RSE 214 manages region data for a shape and client desktop placement position of a window 812 or region for playing the media stream 804, thereby informing the client 808 where to draw the media stream 804 arriving, for example, from the out-of-band channel.

In response to a low bandwidth scenario in the multimedia environment 800 caused, for example, by a complex shape for the window 812 increasing the region data, the security logic 318 may include measures for the bandwidth compensator 316 to select a simpler shape for the media stream display window 812. The simpler shape decreases the amount of region data. In this case, assuming that security is not much of a risk in the multimedia environment 800 (for example, if the multimedia environment 800 is merely a multimedia network for a home), the exemplary RSE 214 can circumscribe the original complex window 812 that needed too much region data to describe with the new, simpler window 814 that is larger than the original window 812. The new larger window 814 is not a larger piece of a server desktop that might contain secret information, but merely an enlarged viewport through which an enlarged version of the media stream 804 will be shown, that is, the visual "footprint" of the media stream 804 is resized to fit the larger window. This larger window 814 prevents truncation of the media content (e.g., losing part of a movie) which would occur if a smaller window than the original complex window 812 were selected to solve the complex window shape problem. The larger window 814, however, may truncate or completely eclipse some of the onscreen controls of a user interface 816 for controlling the media stream 804. While this results in an undesirable operational inconvenience as parts of the client's display canvas have been covered by a larger media stream window, this resolution of a low bandwidth situation results in only a possible a usability issue that is hopefully temporary. Security within the multimedia environment 800 has not been compromised by the applied security measure for low bandwidth.

Exemplary Methods

Figure 9:
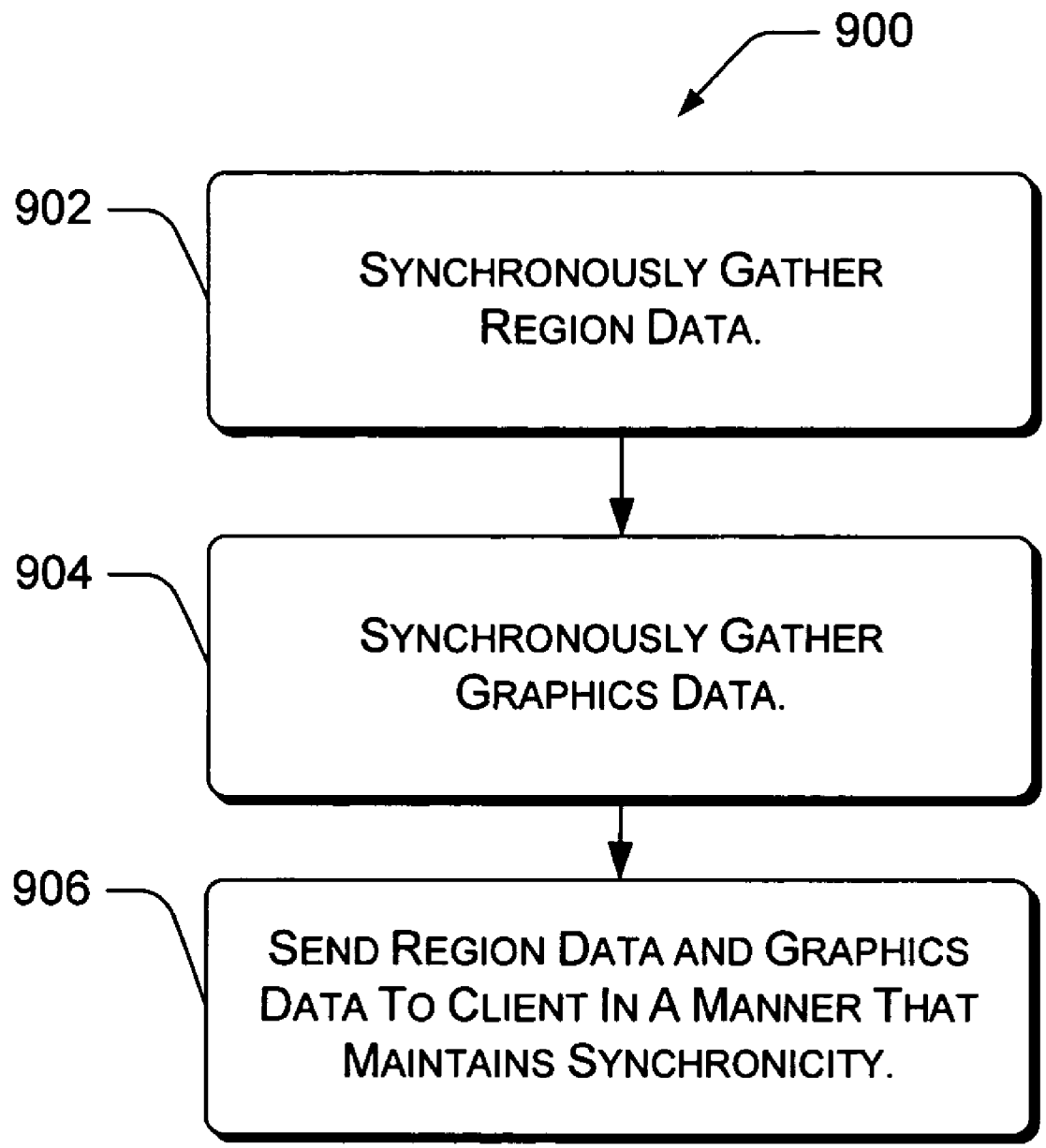
FIG. 9 is a flow diagram of an exemplary method of synchronizing region data and graphics data in a graphics remoting system.

FIG. 9 shows an exemplary method 900 of synchronizing region data and graphics data for a graphics remoting system. The exemplary method 900 can be performed by a device, such as the exemplary RSE 214 shown in FIGS. 2 and 3. In the flow diagram, the operations are summarized in individual blocks. The operations may be performed in hardware and/or as machine-readable instructions (software or firmware) that can be executed by a processor.

At block 902, region data for displaying a region of a server desktop remotely on a client display are synchronously gathered. The region data may describe region geometry, such as a shape and a position of the region on the server desktop and/or a position that the region will occupy on the client's desktop.

At block 904, graphics data for the region are synchronously gathered. The graphics data describe the visual content that will be displayed in the region when the region is executed on the client. Or from another point of view, the region data clip the graphics data into the geometry (shape and position) specified by the region data.

At block 906, the region data and the graphics data are sent to a client while maintaining synchronicity between the region data and the graphics data. Maintaining synchronicity may include avoiding the addition of delays in processing different data streams that represent each of the region data and the graphics data; properly using a remoting protocol to transmit the synchronized data; sequencing a given amount of region data with associated graphics data so that a client can relate the graphics data to the associated region data, etc.

Figure 10:
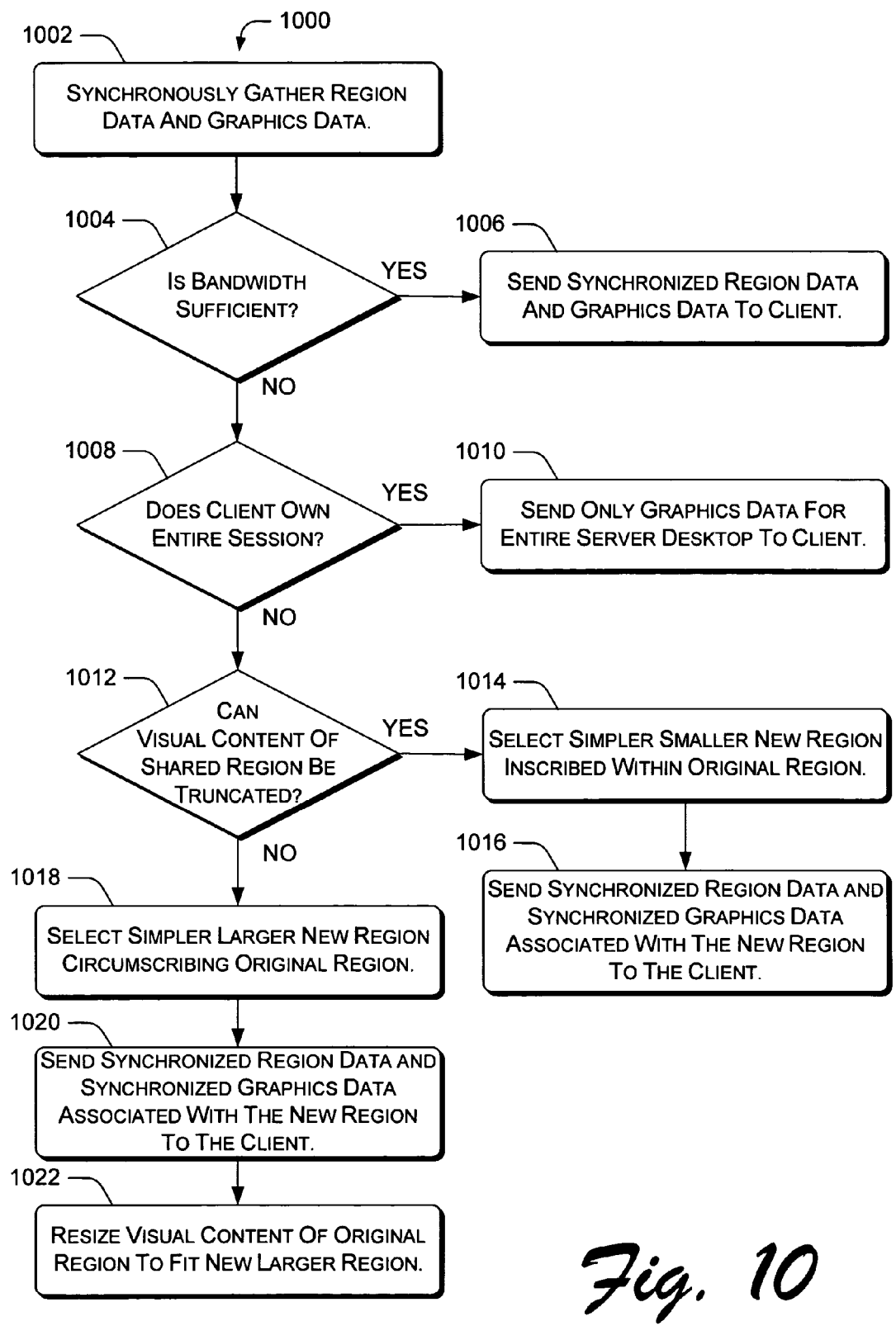
FIG. 10 is a flow diagram of an exemplary method of maintaining security during a low bandwidth condition in an exemplary graphics remoting system in which region data and graphics data are synchronized.

FIG. 10 shows an exemplary method 1000 of maintaining security of private information in the synchronization of region data and graphics data for a graphics remoting system during a condition of low bandwidth, e.g., a temporary low transmission bandwidth between server 202 and client 204. The exemplary method 1000 can be performed by a device, such as the exemplary RSE 214 shown in FIGS. 2 and 3. In the flow diagram, the operations are summarized in individual blocks. The operations may be performed in hardware and/or as machine-readable instructions (software or firmware) that can be executed by a processor.

At block 1002, region data and graphics data are synchronously gathered.

At block 1004, the exemplary method 1000 queries whether there is sufficient bandwidth for sending the synchronized region data and graphics data, for example, within time constraints specified by a remoting protocol 312. If there is not sufficient bandwidth, the exemplary method 1000 branches to block 1006. If there is sufficient bandwidth, the exemplary method 1000 branches to block 1008.

At block 1006, the synchronized region data and synchronized graphics data are sent to the client.

At block 1008, the exemplary method 1000 queries whether the client owns the entire session. If the client owns the entire session, then the exemplary method branches to block 1010. If the client does not own the entire session, then the exemplary method branches to block 1012.

At block 1010, graphics data for the entire server desktop are sent to the client, but region data are not sent.

At block 1012, the exemplary method 1000 queries whether the visual content of the shared region can be truncated. If the visual content of the shared region can be truncated, then the exemplary method 1000 branches to blocks 1014 and 1016. If the visual content of the shared region cannot be truncated, then the exemplary method 1000 branches to blocks 1018, 1020, and 1022.

At block 1014, a simpler smaller new shared region inscribed within the original shared region is selected.

At block 1016, synchronized region data and synchronized graphics data for the new region are sent to the client.

On the other hand, at block 1018, a simpler larger new shared region circumscribing the original shared region is selected.

At block 1020, synchronized region data and synchronized graphics data for the new region are sent to the client.

At block 1022, the visual content for the original shared region may be resized to fit the new larger shared region. However, server desktop graphics are not used to fill in the parts of the new larger window that lie outside the original shared region, as this might defeat the security feature of the exemplary method 1000. The option provided by blocks 1018, 1020, and 1022 are useful when the graphics data are from a source external to the server, such as a multimedia stream from digital storage.

Exemplary Computing Device

Figure 11:
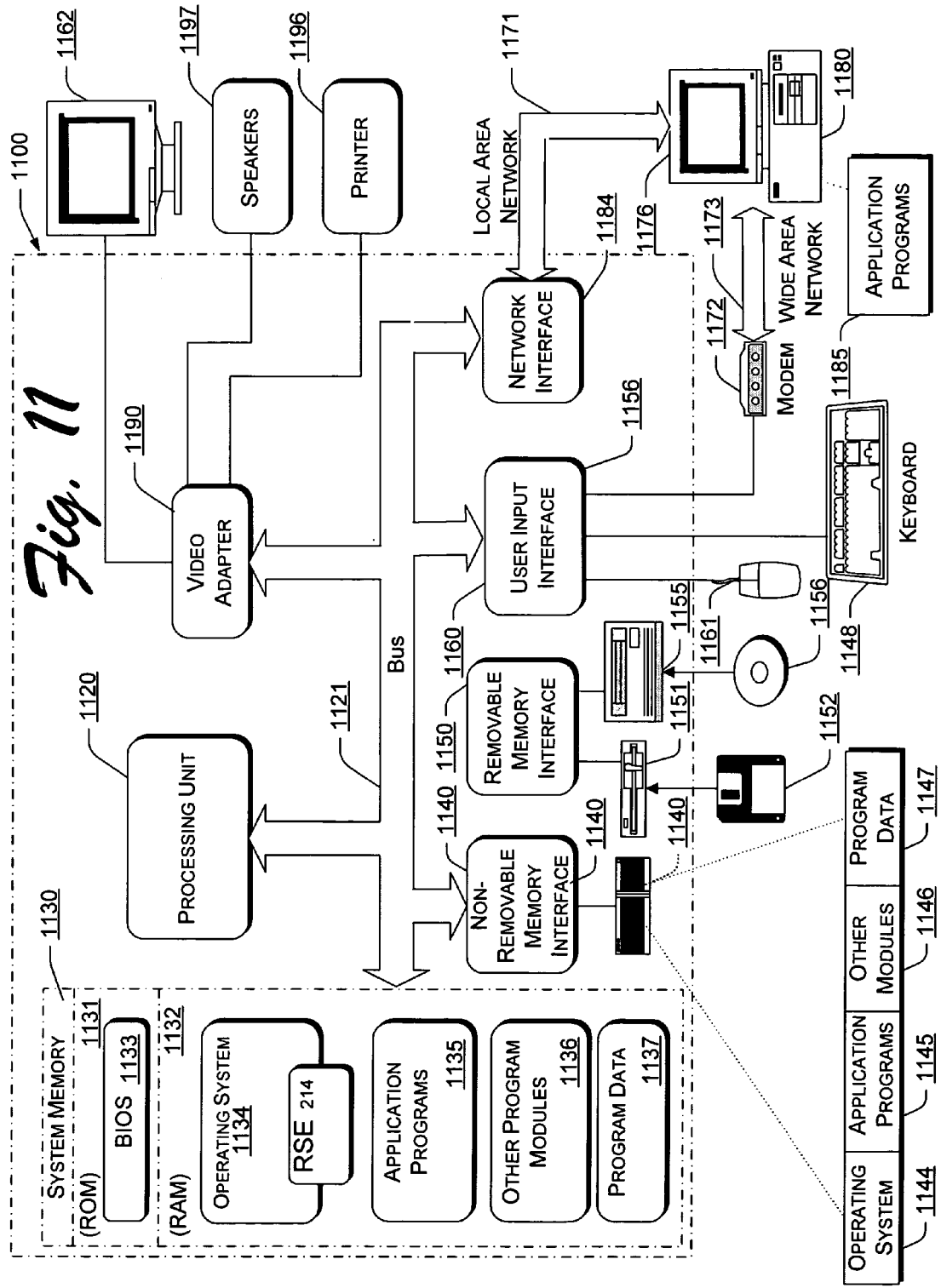
FIG. 11 is a block diagram of an exemplary computing device suitable for practicing some aspects of the subject matter.

FIG. 11 shows an exemplary computing device 1100 suitable as an environment for practicing aspects of the subject matter, for example as a remoting server 202 to host an exemplary RSE 214 or as a client 204. The components of computing device 1100 may include, but are not limited to, a processing unit 1120, a system memory 1130, and a system bus 1121 that couples various system components including the system memory 1130 to the processing unit 1120. The system bus 1121 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISAA) bus, Video Electronics Standards Association (VESA) local bus, and Peripheral Component Interconnect (PCI) bus also known as the Mezzanine bus.

Exemplary computing device 1100 typically includes a variety of computing device-readable media. Computing device-readable media can be any available media that can be accessed by computing device 1100 and includes both volatile and nonvolatile media, removable and non-removable media. By way of example, and not limitation, computing device-readable media may comprise computing device storage media and communication media. Computing device storage media include volatile and nonvolatile, removable and non-removable media implemented in any method or technology for storage of information such as computing device-readable instructions, data structures, program modules, or other data. Computing device storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can be accessed by computing device 1100. Communication media typically embodies computing device-readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection and wireless media such as acoustic, RF, infrared and other wireless media. Combinations of any of the above should also be included within the scope of computing device readable media.

The system memory 1130 includes computing device storage media in the form of volatile and/or nonvolatile memory such as read only memory (ROM) 1131 and random access memory (RAM) 1132. A basic input/output system 1133 (BIOS), containing the basic routines that help to transfer information between elements within computing device 1100, such as during start-up, is typically stored in ROM 1131. RAM 1132 typically contains data and/or program modules that are immediately accessible to and/or presently being operated on by processing unit 1120. By way of example, and not limitation, FIG. 11 illustrates operating system 1134, application programs 1135, other program modules 1136, and program data 1137. Although the exemplary RSE 214 is depicted as software in random access memory 1132, other implementations of an exemplary RSE 214 can be hardware or combinations of software and hardware.

The exemplary computing device 1100 may also include other removable/non-removable, volatile/nonvolatile computing device storage media. By way of example only, FIG. 11 illustrates a hard disk drive 1141 that reads from or writes to non-removable, nonvolatile magnetic media, a magnetic disk drive 1151 that reads from or writes to a removable, nonvolatile magnetic disk 1152, and an optical disk drive 1155 that reads from or writes to a removable, nonvolatile optical disk 1156 such as a CD ROM or other optical media. Other removable/non-removable, volatile/nonvolatile computing device storage media that can be used in the exemplary operating environment include, but are not limited to, magnetic tape cassettes, flash memory cards, digital versatile disks, digital video tape, solid state RAM, solid state ROM, and the like. The hard disk drive 1141 is typically connected to the system bus 1121 through a non-removable memory interface such as interface 1140, and magnetic disk drive 1151 and optical disk drive 1155 are typically connected to the system bus 1121 by a removable memory interface such as interface 1150.

The drives and their associated computing device storage media discussed above and illustrated in FIG. 11 provide storage of computing device-readable instructions, data structures, program modules, and other data for computing device 1100. In FIG. 11, for example, hard disk drive 1141 is illustrated as storing operating system 1144, application programs 1145, other program modules 1146, and program data 1147. Note that these components can either be the same as or different from operating system 1134, application programs 1135, other program modules 1136, and program data 1137. Operating system 1144, application programs 1145, other program modules 1146, and program data 1147 are given different numbers here to illustrate that, at a minimum, they are different copies. A user may enter commands and information into the exemplary computing device 1100 through input devices such as a keyboard 1148 and pointing device 1161, commonly referred to as a mouse, trackball, or touch pad. Other input devices (not shown) may include a microphone, joystick, game pad, satellite dish, scanner, or the like. These and other input devices are often connected to the processing unit 1120 through a user input interface 1160 that is coupled to the system bus, but may be connected by other interface and bus structures, such as a parallel port, game port, or a universal serial bus (USB). A monitor 1162 or other type of display device is also connected to the system bus 1121 via an interface, such as a video interface 1190. In addition to the monitor 1162, computing devices may also include other peripheral output devices such as speakers 1197 and printer 1196, which may be connected through an output peripheral interface 1195.

The exemplary computing device 1100 may operate in a networked environment using logical connections to one or more remote computing devices, such as a remote computing device 1180. The remote computing device 1180 may be a personal computing device, a server, a router, a network PC, a peer device or other common network node, and typically includes many or all of the elements described above relative to computing device 1100, although only a memory storage device 1181 has been illustrated in FIG. 11. The logical connections depicted in FIG. 11 include a local area network (LAN) 1171 and a wide area network (WAN) 1173, but may also include other networks. Such networking environments are commonplace in offices, enterprise-wide computing device networks, intranets, and the Internet.

When used in a LAN networking environment, the exemplary computing device 1100 is connected to the LAN 1171 through a network interface or adapter 1170. When used in a WAN networking environment, the exemplary computing device 1100 typically includes a modem 1172 or other means for establishing communications over the WAN 1173, such as the Internet. The modem 1172, which may be internal or external, may be connected to the system bus 1121 via the user input interface 1160, or other appropriate mechanism. In a networked environment, program modules depicted relative to the exemplary computing device 1100, or portions thereof, may be stored in the remote memory storage device. By way of example, and not limitation, FIG. 11 illustrates remote application programs 1185 as residing on memory device 1181. It will be appreciated that the network connections shown are exemplary and other means of establishing a communications link between the computing devices may be used.

CONCLUSION

It should be noted that the subject matter described above can be implemented in hardware, in software, or in both hardware and software. In certain implementations, the exemplary system, engine, and related methods may be described in the general context of computing device-executable instructions, such as program modules, being executed by a television set-top box and/or by a computing device. Generally, program modules include routines, programs, objects, components, data structures, etc. that perform particular tasks or implement particular abstract data types. The subject matter can also be practiced in distributed communications environments where tasks are performed over wireless communication by remote processing devices that are linked through a communications network. In a wireless network, program modules may be located in both local and remote communications device storage media including memory storage devices.

The foregoing discussion describes exemplary systems and methods synchronizing region data and graphics data for graphics remoting systems.

Although the subject matter has been described in language specific to structural features and/or methodological acts, it is to be understood that the subject matter defined in the appended claims is not necessarily limited to the specific features or acts described. Rather, the specific features and acts are disclosed as exemplary forms of implementing the claims.

The invention claimed is:

1. A method implemented at a server device, the method comprising:
    gathering region data for displaying a region of a server desktop remotely on a client display, wherein the region data describe a shape and a position of the region;
    gathering graphics data for the region, wherein the graphics data describe visual content of the region, and wherein the region data and the graphics data are gathered synchronously so as to maintain an association of the region data and the graphics data;
    sending the region data and the graphics data to a client in a sequential order that represents the association between the region data and the graphics data such that the client can determine which graphics data and region data are related; and
    in an event that bandwidth becomes too low to send the region data and the graphics data to the client, reducing the amount of data to send by gathering the region data and the graphics data for a larger region that encompasses the region and that requires less data to describe.

2. The method as recited in claim 1, wherein the region data and the graphics data are gathered in a single display driver.

3. The method as recited in claim 2, wherein the region data and the graphics data are gathered and stored in a format of a remoting protocol.

4. The method as recited in claim 3, wherein the region data is synchronously gathered by a display driver-level window object created to contain the shape and position information.

5. The method as recited in claim 3, wherein the graphics data is synchronously gathered by the display driver.

6. The method as recited in claim 5, wherein the display driver synchronously gathers the graphics data by gathering drawing commands issued to a graphics device interface subsystem of an operating system of the server.

7. The method as recited in claim 1, wherein the region data and the graphics data is sent to the client in the sequential order such that the region data precedes the graphics data.

8. The method as recited in claim 7, further comprising sequencing the region data to precede the graphics data using rules of a remoting protocol.

9. The method as recited in claim 8, further comprising receiving the region data and the graphics data for display on a client and displaying the graphics data according to the preceding region data.

10. The method as recited in claim 1, wherein in the event that the bandwidth becomes too low to send the region data and the graphics data, reducing the amount of data to send by sending no region data and sending graphics data for the entire server desktop.

11. The method as recited in claim 1, wherein in the event that the bandwidth becomes too low to send the region data and the graphics data, reducing the amount of data to send by sending region data for a subset of the region and by sending graphics data for the subset.

12. The method as recited in claim 11, wherein the subset has a geometry that requires less region data to describe.

13. The method as recited in claim 1, further comprising enlarging the visual content of the region to fit the larger region when reducing the amount of data to send.

14. The method as recited in claim 1, further comprising:
receiving the region data and the graphics data; and
displaying the graphics data as graphics in a region of a client desktop described by the region data.

15. A remoting synchronization engine, comprising:
a region data gathering module to gather region data describing a region of a display desktop of a server to be remotely displayed on a client, wherein the region data describe a shape and a desktop position of the region;
a graphics data gathering module to gather graphics data, wherein the graphics data describe a visual content of the region, and wherein the region data and the graphics data are gathered synchronously so as to maintain an association of the region data and the graphics data;
a display driver at the server to collect the region data and the graphics data while maintaining the association between the region data and the graphics data; and
a data output scheduler to send the region data and the graphics data to the client in a sequence which represents the association between the region data and the graphics data, and in an event that bandwidth becomes too low to send the region data and the graphics data to the client, reducing the amount of data to send by gathering the region data and the graphics data for a larger region that encompasses the region and that requires less data to describe.

16. The remoting synchronization engine as recited in claim 15, wherein the region data precedes the graphics data in the sequence which represents the association between the region data and the graphics data.

17. The remoting synchronization engine as recited in claim 16, further comprising a bandwidth compensator to maintain security with respect to the synchronized region data and the synchronized graphics data during a condition of low bandwidth.

18. The remoting synchronization engine as recited in claim 15, further comprising a data gathering scheduler to schedule synchronous gathering of region data and graphics data synchronized to the region data.

19. A synchronized remoting system, comprising:
a means for producing visual content at a server to be remotely displayed on a client;
a means for designating a visual region of the visual content
a means for gathering region data describing a geometry of the visual region;
a means for gathering graphics data describing the visual content in the visual region, wherein the graphics data is gathered synchronously with the region data so as to maintain an association of the region data and the graphics data;
a means for sending the region data and the graphics data from the server to the client in a sequential order which represents an association between the region data and the graphics data, wherein region data in synchronicity with particular graphics data precedes the particular graphics data; and
in an event that bandwidth becomes too low to send the region data and the graphics data to the client, reducing the amount of data to send by gathering the region data and the graphics data for a larger region that encompasses the visual region and that requires less data to describe.

20. The synchronized remoting system as recited in claim 19, further comprising:
a means for receiving the region data and the graphics data at the client; and
a means for displaying the graphics data as graphics in a region of a client desktop described by the region data.

21. A method, comprising:
transmitting region data describing geometry of a visual region to be remotely displayed, wherein the region data recurs at regular intervals in a data stream to update the geometry of the visual region;
transmitting graphics data describing visual content of the visual region, wherein the graphics data recurs at the regular intervals to update the visual content and wherein the region data of each regular interval precedes the graphics data of the corresponding regular interval in the data stream in a sequential order which represents an association between the region data and the graphics data; and
in an event that bandwidth becomes too low to transmit the region data and the graphics data, reducing the amount of data to transmit by gathering the region data and the graphics data for a larger region that encompasses the visual region and that requires less data to describe.

22. The method as recited in claim 21, wherein the region data and the graphics data for each regular interval are gathered synchronously so as to maintain an association of the region data and the graphics data.

23. A method, comprising:
gathering region data and graphics data synchronously so as to maintain an association of the region data and the graphics data from a visual region of a computing server display to be remotely displayed on a client display;
if bandwidth is sufficient for sending the region data and the graphics data to the client, then sending the region data and the graphics data to the client, wherein a region datum in synchronicity with a graphics datum is sent before the graphics datum in a sequential order that represents the association of the region data and the graphics data;
if bandwidth is not sufficient for sending the region data and the graphics data to the client, then
(a) if the client owns an entirety of information displayable on the computing server display, then sending only graphics data describing the entire visual content of the computing server display; but
(b) if the client does not own an entirety of information displayable on the computing server display, then (i) if visual content of the visual region can be truncated, then selecting a smaller visual region inscribed in the visual region and sending synchronized region data and synchronized graphics data associated with the smaller visual region; but (ii) if the visual content of the visual region cannot be truncated, then selecting a larger visual region circumscribing the visual region, sending synchronized region data and synchronized graphics data associated with the larger visual region, and resizing visual content of the visual region to fit the larger visual region.

24. One or more computing device readable media containing instructions that are executable by a computing device to perform actions comprising:

gathering region data for displaying a visual region of a server desktop remotely on a client display, wherein the region data describe a shape and a position of the visual region;

gathering graphics data for the visual region, wherein the graphics data describe a visual content of the visual region, and wherein the region data and the graphics data are gathered synchronously so as to maintain an association of the region data and the graphics data; and sending the region data and the graphics data to a client in a sequential order that represents the association between the region data and the graphics data such that the client can determine which graphics data and region data are related; and in an event that bandwidth becomes too low to send the region data and the graphics data to the client, reducing the amount of data to send by gathering the region data and the graphics data for a larger region that encompasses the visual region and that requires less data to describe.

25. The one or more computing device readable media as recited in claim 24, wherein maintaining the association further comprises preceding graphics data to be sent to the client with the region data synchronized to the graphics data.

26. The one or more computing device readable media as recited in claim 24, wherein the region data and the graphics data are synchronously gathered into one display driver.

* * * * *